US012510217B1

(12) United States Patent
Cai

(10) Patent No.: US 12,510,217 B1
(45) Date of Patent: Dec. 30, 2025

(54) LIGHT STRIP STRUCTURE

(71) Applicant: Chengchan Cai, Yangjiang (CN)

(72) Inventor: Chengchan Cai, Yangjiang (CN)

( * ) Notice: Subject to any disclaimer, the term of this patent is extended or adjusted under 35 U.S.C. 154(b) by 0 days.

(21) Appl. No.: 19/241,254

(22) Filed: Jun. 17, 2025

(51) Int. Cl.

| | |
|---|---|
| ***F21S 4/28*** | (2016.01) |
| ***F21V 1/04*** | (2006.01) |
| ***F21V 5/00*** | (2018.01) |
| ***F21V 7/00*** | (2006.01) |
| ***F21V 7/05*** | (2006.01) |
| ***F21V 13/12*** | (2006.01) |
| ***F21V 17/00*** | (2006.01) |
| ***F21V 23/00*** | (2015.01) |
| ***F21V 31/00*** | (2006.01) |
| ***F21Y 103/10*** | (2016.01) |

(52) U.S. Cl.
CPC .................. *F21S 4/28* (2016.01); *F21V 1/04* (2013.01); *F21V 5/007* (2013.01); *F21V 7/0058* (2013.01); *F21V 7/05* (2013.01); *F21V 13/12* (2013.01); *F21V 17/005* (2013.01); *F21V 23/002* (2013.01); *F21V 31/005* (2013.01); *F21Y 2103/10* (2016.08)

(58) Field of Classification Search
CPC .... F21S 4/28; F21V 1/04; F21V 5/007; F21V 7/0058; F21V 7/05; F21V 13/12; F21V 17/005; F21V 23/002; F21V 31/005; F21Y 2103/10
See application file for complete search history.

(56) References Cited

U.S. PATENT DOCUMENTS

| | | | | |
|---|---|---|---|---|
| 7,048,413 | B2 * | 5/2006 | Fan | F21S 4/26 362/248 |
| 8,376,576 | B2 * | 2/2013 | Sloan | F21V 21/005 362/555 |
| 11,859,784 | B1 * | 1/2024 | Li | F21V 23/002 |
| 11,906,131 | B2 * | 2/2024 | Kay | F21S 8/061 |
| 12,117,135 | B1 * | 10/2024 | Chen | F21S 4/22 |
| 12,270,519 | B1 * | 4/2025 | Li | F21S 4/26 |
| 2006/0197474 | A1 * | 9/2006 | Olsen | H05B 45/40 315/312 |
| 2007/0171640 | A1 * | 7/2007 | Sloan | F21V 21/088 362/240 |
| 2010/0214770 | A1 * | 8/2010 | Anderson | F21V 33/0012 362/133 |

(Continued)

*Primary Examiner* — Tsion Tumebo
(74) *Attorney, Agent, or Firm* — Birchwood IP

(57) ABSTRACT

A light strip structure is provided, which includes a light transmitting member, a light blocking member, a wire, and a capsule light dispersing member. The light transmitting member is provided with an accommodating cavity along a length direction, the wire is provided in the accommodating cavity and is provided with a plurality of light beads, and the capsule light dispersing member is wrapped around the light beads. The light blocking member is connected to the light transmitting member, and light emitted by the light beads diverges through the capsule light dispersing member and is excited along the light transmitting member. The present disclosure can fully and uniformly spread the light emitted by the light beads along the entire length direction of the lamp strip, thereby avoiding dark areas between adjacent light beads caused by insufficient coverage of light; at the same time, it effectively eliminates the phenomenon of light spots.

7 Claims, 6 Drawing Sheets

(56) References Cited

U.S. PATENT DOCUMENTS

| | | | | |
|---|---|---|---|---|
| 2012/0113675 | A1* | 5/2012 | Yang | F21V 13/08 362/218 |
| 2015/0345743 | A1* | 12/2015 | Trincia | F21V 5/048 362/217.05 |
| 2020/0109828 | A1* | 4/2020 | Tolen | F21V 15/012 |

* cited by examiner

LIGHT STRIP STRUCTURE

TECHNICAL FIELD

The present disclosure relates to the field of light strip technologies, and in particular, to a light strip structure.

BACKGROUND

At present, the common light strip structure mainly consists of a flexible circuit board (FPC) containing wire materials or a rigid circuit board as a substrate. Multiple light emitting diode (LED) beads are evenly arranged on the circuit board at a certain distance, and then the beads and circuit parts are encapsulated and protected by packaging materials, thereby forming a strip-shaped lighting product with certain flexibility and waterproof and dustproof performance. This basic structure not only achieves the basic lighting function of the light strip, but also provides the possibility for the application of the light strip in different environments.

However, in practical applications, the existing light strip structure gradually exposes a prominent problem: there are dark areas and light spots between the light beads. The root cause of this problem mainly lies in the luminous characteristics of the light beads themselves and the limitations of the lamp strip structure. As a point light source, LED beads have a relatively fixed angle of emission, and the light radiates outwards from the center of the light beads. When multiple light beads are arranged on the light strip at a certain distance, it is difficult to achieve seamless connection between adjacent light beads in the illuminated area, resulting in a significant decrease in light intensity in the edge area covered by adjacent light beads, thus forming a dark area. At the same time, due to factors such as the packaging process of light beads, the flatness of circuit boards, and the optical properties of packaging materials, light may undergo irregular refraction, reflection, and scattering during propagation, resulting in excessive concentration of light in some areas and the formation of obvious light spots.

The presence of dark areas and light spots has a significant negative impact on the illumination effect of the light strip. In lighting scenes, dark areas can cause uneven brightness in the illuminated area, which will result in obvious alteration of light and dark, which destroys the coherence and comfort of the overall lighting. For example, in indoor decorative lighting, dark areas may prevent certain areas of walls or decorations from being fully illuminated, affecting the complete presentation of the decorative effect. In landscape lighting, dark areas can disrupt an overall visual aesthetic of the landscape and fail to achieve the expected lighting design goals. And the light spot will cause the illumination area to appear locally too bright, which not only causes visual discomfort, but may also create a dazzling feeling, reducing people's experience of the lighting environment. Furthermore, the presence of light spots and dark areas may also lead to a decrease in the overall luminous efficiency of the light strip, as some of the light fails to effectively illuminate a target area, which will result in energy waste.

In order to solve the problem of dark areas and light spots between light beads in the existing light strip structure, a series of explorations and attempts have been made in the field. For example, some manufacturers reduce the occurrence of dark areas by increasing the arrangement density of light beads. However, this method not only increases the manufacturing cost of the light strip, but also generates more heat during operation, which proposes higher requirements on the heat dissipation performance of the light strip and increases the difficulty and cost of heat dissipation design. There are also some technical solutions that attempt to redistribute light using special packaging materials or optical lenses, but these solutions often have problems such as complex processes, high costs, and adverse effects on the overall flexibility and installation convenience of the light strip, rendering it difficult to achieve large-scale promotion and application in the market.

Therefore, developing a new type of LED strip structure that can effectively solve problems of dark areas and light spots between LED beads without significantly increasing costs and complexity is of great practical significance for improving the lighting quality of LED strips, expanding their application scope, and promoting further development of lighting technology.

SUMMARY

The purpose of the present disclosure is to overcome the shortcomings of existing technology and provide a light strip structure.

In order to solve the above technical problems, the present disclosure adopts the following technical solution.

An embodiment of the present disclosure provides a light strip structure, including: a light transmitting member, a light blocking member, a wire, and a capsule light dispersing member. The light transmitting member is provided with an accommodating cavity along a length direction, the wire is provided in the accommodating cavity. The wire is provided with a plurality of light beads that are uniformly distributed, and the capsule light dispersing member is wrapped around the light beads. The light blocking member is connected to the light transmitting member, and light emitted by the light beads diverges through the capsule light dispersing member and is emitted along the light transmitting member.

The beneficial effect of the lamp strip structure of the present disclosure compared to the prior art is that: by uniformly distributing the plurality of light beads on the wire, and each light bead is wrapped by the capsule light dispersing member, the capsule light dispersing member can uniformly scatter the light emitted by the light beads. Through the scattering effect of the capsule light dispersing member, the light can be more evenly distributed at various positions of the light transmitting member, thereby avoiding the dark areas caused by insufficient coverage of light between adjacent light beads, and rendering the overall light emission of the lamp strip more uniform and continuous. Besides that, the capsule light dispersing member has a scattering effect on the light of the light bead, causing the light to be emitted from multiple directions and changing the original concentrated propagation direction of the light. When the light shines on surrounding objects or surfaces, it will not produce obvious shadows on the objects due to the point light source characteristics of the light bead like traditional light strips. After scattering, the light can illuminate the surrounding environment in a softer and wider way, thereby effectively eliminating shadow phenomena and improving the lighting quality and visual effect of the lamp strip. Furthermore, the capsule light dispersing member effectively disperses and homogenizes the light, allowing it to be more evenly distributed when propagating through the light transmitting member. When the light is emitted from the light transmitting member, there will be no local light that is too strong and forms a light spot. The brightness of the entire emitting surface of the light strip is more uniform and consistent, thereby improving the beauty and lighting effect of the light strip.

Further description of the present disclosure will be provided in combination with the accompanying drawings and specific embodiments.

BRIEF DESCRIPTION OF DRAWINGS

In order to provide a clearer explanation of the technical solution in the embodiments of the present disclosure, a brief introduction will be given to the drawings required for embodiments or prior art descriptions. It is obvious that the drawings described below are only some embodiments of the present disclosure. For those skilled in the art, other drawings can be obtained based on these drawings without requiring creative work.

DESCRIPTION OF EMBODIMENTS

Figure 1:
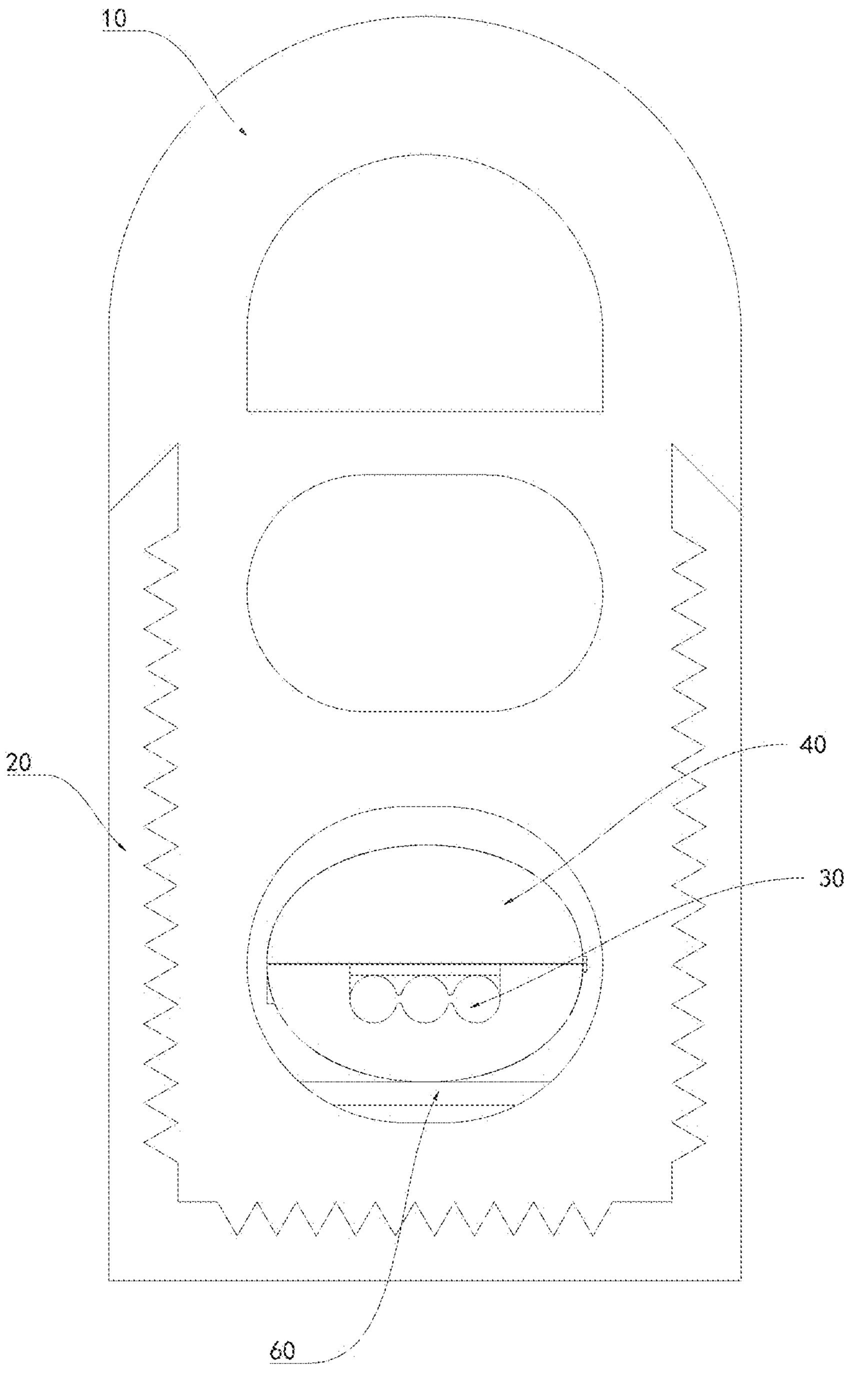
FIG. 1 is a front view of a structural schematic diagram of a light strip provided by the present disclosure.

In order to clarify the purpose, technical solution, and advantages of the present disclosure, further detailed explanations will be provided below in combination with the accompanying drawings and specific implementation modes.

Referring to specific embodiments shown in FIGS. 1 to 7, the present disclosure discloses a light strip structure, including: a light transmitting member 10, a light blocking member 20, a wire 30, and a capsule light dispersing member 40. The light transmitting member 10 is provided with an accommodating cavity 11 along a length direction; the wire 30 is provided in the accommodating cavity 11. The wire 30 is provided with a plurality of light beads 50 that are uniformly distributed; the capsule light dispersing member 40 is wrapped around the light beads 50. The light blocking member 20 is connected to the light transmitting member 10, and light emitted by the light beads 50 diverges through the capsule light dispersing member 40 and is emitted along the light transmitting member 10.

In an implementation mode, materials with certain transparency, good optical performance, and strength (such as polycarbonate, acrylic, etc.) are selected to make the light transmitting member 10. The light transmitting member 10 is a long strip shape, and the accommodating cavity 11 is formed by molding in its length direction through a mold. The shape and size of the accommodating cavity 11 need to be designed according to installation requirements of the wire 30, the light beads 50, and the capsule light dispersing member 40, to ensure smooth accommodation of these components and provide a certain amount of fixing and protective space for the wire 30 and capsule light dispersing member 40. Selecting appropriate types and specifications of light beads (such as LED chips), and determining the quantity and spacing of the light beads 50 according to design requirements. Welding or otherwise fixing the light beads 50 evenly onto the wire 30 to ensure a stable and reliable electrical connection between each light bead 50 and the wire 30. The capsule light dispersing member 40 is usually made of transparent or semi-transparent materials with good astigmatism performance (such as astigmatism plastic, silicone, etc.), and its shape is designed as a capsule with a hollow interior. Wrapping the capsule light dispersing member 40 one by one around the light beads 50 already installed on the wire 30, ensuring that the capsule light dispersing member 40 is tightly attached to the light beads 50, so that the light emitted by the light beads 50 can fully enter the interior of the capsule light dispersing member 40 for scattering. The capsule light dispersing member 40 can also be fixed to the light beads 50 through adhesive bonding, hot melt fixation, and other methods to prevent it from falling off during use. Selecting the wire 30 with good conductivity, flexibility, and durability, such as copper core wire, and choosing the appropriate specification of the wire 30 based on the power and number of the light beads 50.

Figure 4:
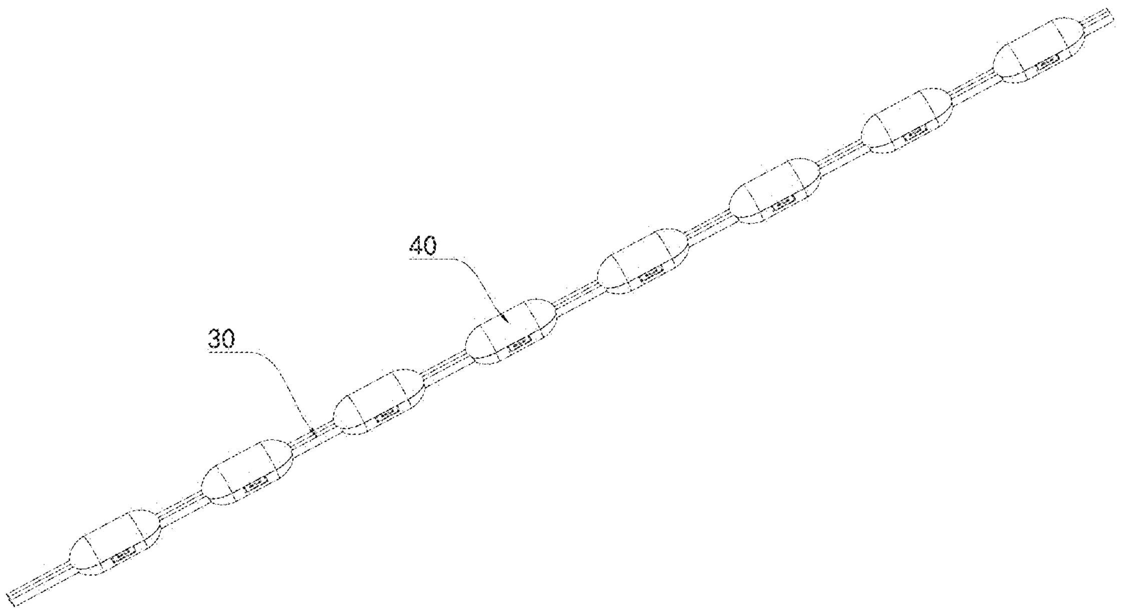
FIG. 4 is a schematic structural diagram of the light strip provided by the present disclosure.

First, welding the light beads 50 to the wire 30 at equal distances, then wrapping each light bead 50 with the capsule light dispersing member 40 to form a lamp string (as shown in FIG. 4), and then laying the lamp string along the accommodating cavity 11 of the light transmitting member 10. The light blocking member 20 is made of opaque materials (such as black plastic, metal, etc.), and its shape and size are designed according to the structure of the light transmitting member 10 to ensure a tight connection with it. The light blocking member 20 can be connected to the light transmitting member 10 through snap fasteners, adhesive bonding, screw fixation, and other methods. After connecting, it is necessary to ensure that there is no gap between the light blocking member 20 and the light transmitting member 10, which can effectively block light from exiting from areas that do not require light transmission.

That is to say, by evenly distributing a plurality of light beads 50 on the wire 30, and each light bead 50 is wrapped by the capsule light dispersing member 40, the capsule light dispersing member 40 can uniformly scatter the light emitted by the light beads 50. Through a scattering effect of the capsule light dispersing member 40, the light can be more evenly distributed at various positions of the light transmitting member 10, thereby avoiding dark areas between adjacent light beads 50 due to insufficient light coverage, and rendering the overall light emission of the lamp strip more uniform and continuous. Besides that, the capsule light dispersing member 40 has a scattering effect on the light of the light bead 50, causing the light to be emitted from multiple directions and changing the original concentrated propagation direction of the light. When the light shines on surrounding objects or surfaces, it will not produce obvious shadows on the object due to the point light source characteristics of the light bead 50 like traditional light strips. After scattering, the light can illuminate the surrounding environment in a softer and wider way, effectively eliminating shadow phenomena and improving the lighting quality and visual effect of the light strip. Furthermore, the capsule light dispersing member 40 effectively spreads and homogenizes the light, allowing it to be more evenly distributed when propagating through the light transmitting member 10. When the light is emitted from the light transmitting member 10, there will be no local light that is too strong and forms a light spot, and the brightness of the entire emitting surface of the light strip will be more uniform and consistent, thereby improving the beauty and lighting effect of the light strip.

Figure 2:
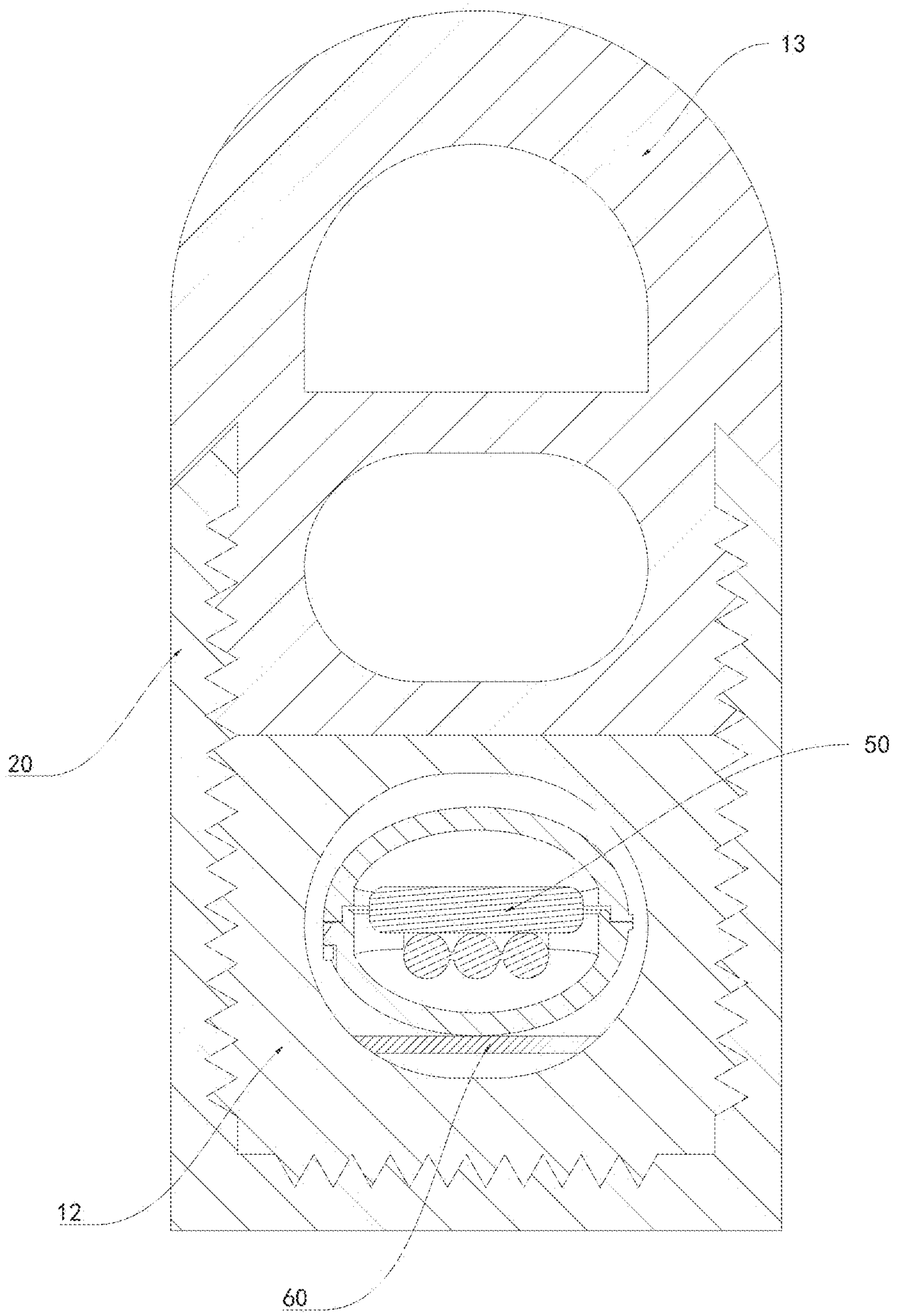
FIG. 2 is a sectional schematic structural diagram of the light strip provided by the present disclosure.
Figure 3:
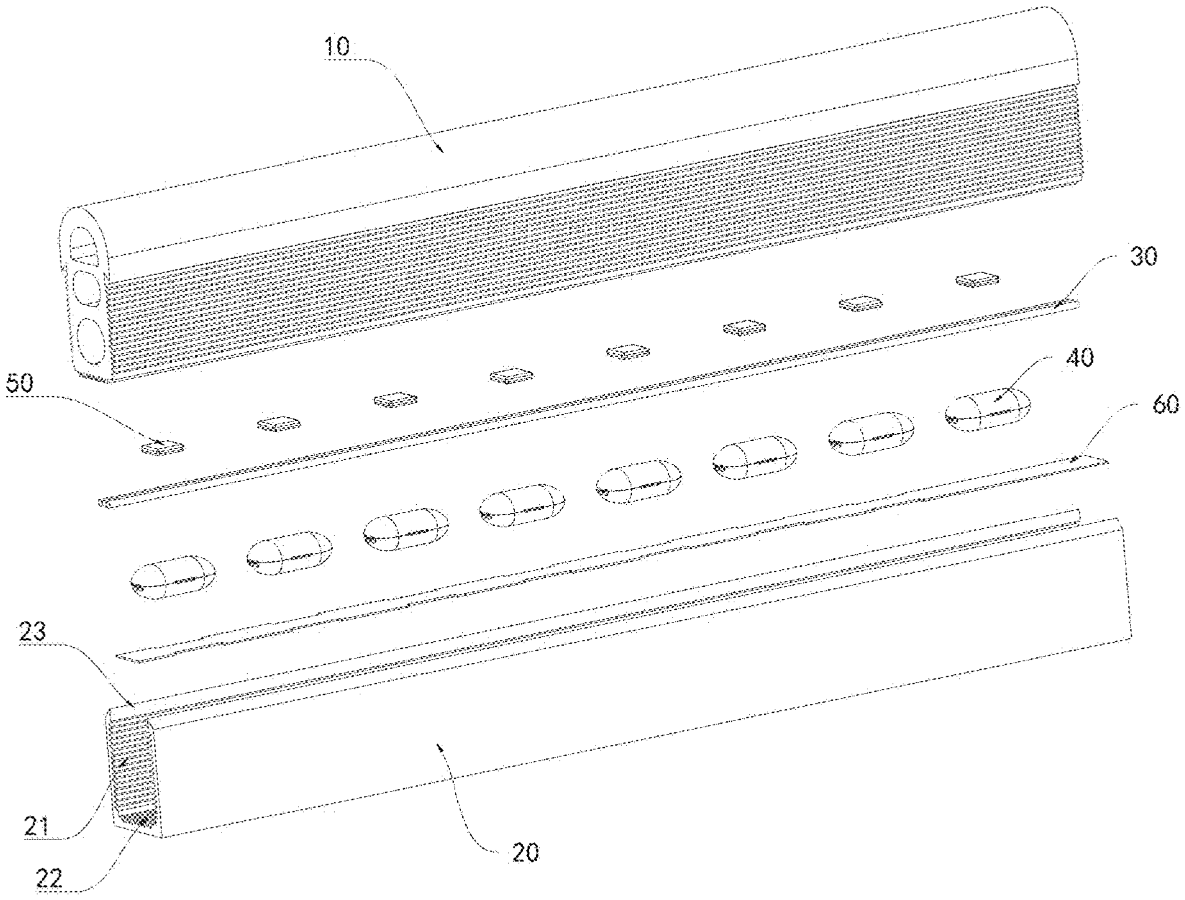
FIG. 3 is an exploded schematic structural diagram of the light strip provided by the present disclosure.

As shown in FIGS. 1 to 3, in an implementation mode, a bottom of the accommodating cavity 11 is provided with a reflective sheet 60, and the wire 30 is provided on an upper surface of the reflective sheet 60.

In an implementation mode, a reflective sheet 60 is laid at the bottom of the accommodating cavity 11. There are multiple ways for the reflective sheet 60, including the follows.

Plastic sheet form: choosing silver or white plastic sheets, cutting them according to a size of the bottom of the accommodating cavity 11, so that they can fit tightly to the bottom of the accommodating cavity 11. Fixing the reflective sheet 60 at the bottom of the accommodating cavity 11 by adhesive bonding to ensure a firm bond and prevent the reflective sheet 60 from falling off during use.

FPC (Flexible Circuit Board) form: if the FPC is used as the reflective sheet 60, a high reflectivity metal layer (such as silver layer) is plated on a surface of the FPC to enable it to reflect light. Cutting and bending the FPC according to a shape of the bottom of the accommodating cavity 11, and then fixing it to the bottom of the accommodating cavity 11 by welding or conductive adhesive bonding.

Coating form: a special coating is applied to the surface of the reflective sheet 60 to form a reflective coating. This type of coating typically contains high reflectivity metal powders (such as aluminum powder) or other reflective materials. The coating is evenly applied to the surface of the reflective sheet 60 through spraying, brushing, and other processes, then drying and curing. The reflective sheet 60 is then fixed to the bottom of the accommodating cavity 11 by adhesive bonding to ensure a firm bond and prevent the reflective sheet 60 from falling off during use.

Surface painting form: using paint containing high reflectivity pigments (such as silver or white pigments) and evenly spraying it on the surface of the reflective sheet 60 through painting equipment. During the painting process, it is necessary to control the thickness and uniformity of the paint to ensure good reflection effect. After the painting is completed, appropriate drying and curing treatment should be carried out, and then the reflective sheet 60 should be fixed at the bottom of the accommodating cavity 11 by adhesive bonding to ensure a firm bond and avoid the reflective sheet 60 from falling off during use.

That is to say, the light emitted by the light bead 50 diverges through the capsule light dispersing member 40 and spreads outwards, with some of the light spreading onto the reflective sheet 60. The reflective sheet 60, due to its high reflectivity characteristics of silver or white, can reflect the light spread onto it again. These reflected light rays, together with other light rays directly directed towards the light transmitting member 10, increase a total amount of light directed towards the light transmitting member 10, thereby significantly improving the brightness of the light. For example, without the reflective sheet 60, some of the light may not be effectively utilized due to spreading to the bottom of the accommodating cavity 11, and the setting of the reflective sheet 60 allows this part of the light to be reused, thereby improving the overall brightness of the light strip. Besides that, the reflection effect of the reflective sheet 60 on the light makes the distribution of light in the accommodating cavity 11 more uniform. The situation where brightness differences may have formed in certain areas due to uneven light diffusion has been improved. The reflected light mixes with other light rays, rendering the brightness of the entire light-emitting surface of the light strip more consistent, avoiding the phenomenon of local brightness or darkness, and further improving the lighting quality and visual effect of the light strip. Furthermore, the reflection of light by the reflective sheet 60 reduces the loss of light in the accommodating cavity 11. The light that could have been absorbed or scattered in useless directions by the bottom of the accommodating cavity 11 has been reused, improving the utilization rate of light and achieving more efficient lighting effects at the same power of the light bead 50, thereby reducing energy consumption.

Figure 5:
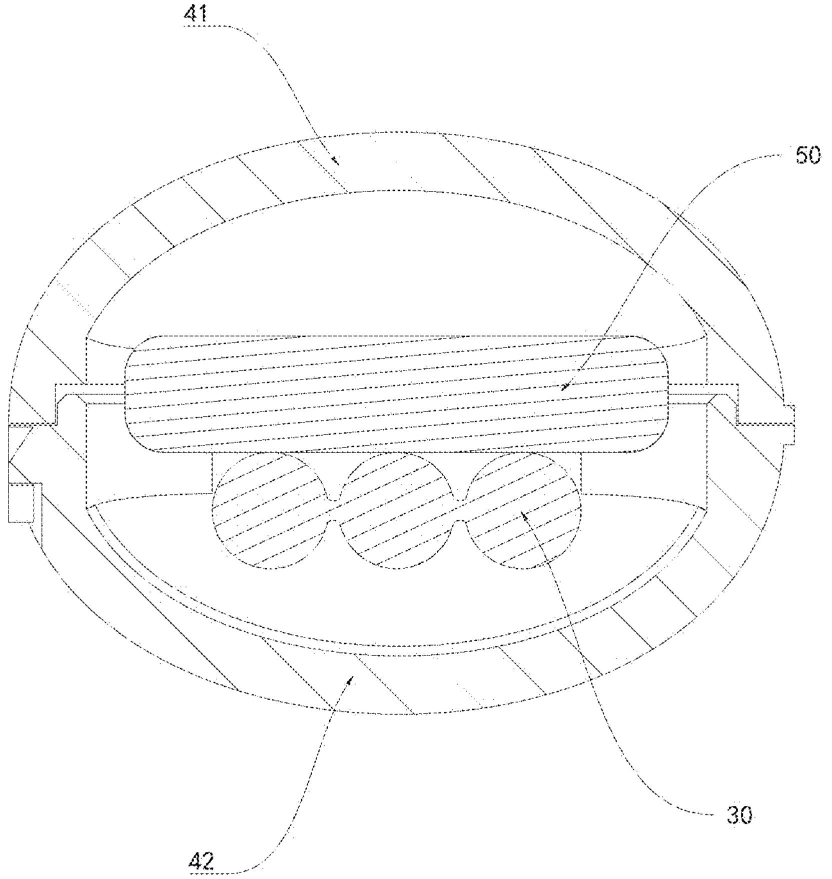
FIG. 5 is a schematic sectional view of the light strip provided by the present disclosure.

As shown in FIGS. 3 to 5, in an implementation mode, the capsule light dispersing member 40 is composed of an upper shell 41 and a lower shell 42, and the upper shell 41 and the lower shell 42 form a folded connection.

In an implementation mode, transparent or semi-transparent materials with good astigmatism performance (such as astigmatism plastic, silicone, etc.) are used to produce the upper shell 41 and the lower shell 42 of the capsule light dispersing member 40 through injection molding. The shapes of the upper shell 41 and the lower shell 42 are designed as a semi-capsule shape. During the manufacturing process, their size and shape are precisely controlled to ensure that they can perfectly fit together to form a complete capsule shape. At a connection between the upper shell 41 and the lower shell 42, a mold design is adopted to form a folded connection structure at this connection. This folding connection can be achieved by designing a thinner connection area, allowing the upper shell 41 and lower shell 42 to rotate relative to each other around this connection area, facilitating subsequent assembly operations. Furthermore, recesses are designed at two ends of the upper shell 41 and the lower shell 42, and the shapes and sizes of the recesses are precisely designed according to the specifications of the wire 30. When the upper shell 41 and the lower shell 42 are combined together, the recesses at two ends correspond to each other and combine to form perforations. A diameter of the perforation is slightly larger than a diameter of the wire 30 to ensure that wire 30 can pass through smoothly without being too large and losing its limiting function. Design buckle structures at edges of the upper shell 41 and the lower shell 42. For example, protruding buckles can be provided at an edge of the upper shell 41, and corresponding clamp slots can be provided at an edge of the lower shell 42. When the upper shell 41 and the lower shell 42 are fastened, the buckle can accurately fit into the clamp slot, thereby forming a stable connection state.

Placing the wire 30 with the light bead 50 installed in a corresponding position of the lower shell 42, so that the wire 30 passes through the recesses at the two ends of the lower shell 42. Due to a preliminary positioning effect of the recesses on the wire 30, it can prevent the wire 30 from shifting during assembly. The upper shell 41 is rotated along the folding connection to engage it with the lower shell 42. During a fastening process, the recesses at the two ends of the upper shell 41 are accurately aligned with the recesses at the two ends of the lower shell 42, thereby forming a complete perforation and further limiting the wire 30. At the same time, the buckle on the edge of the upper shell 41 is inserted into the clamp slot on the edge of the lower shell 42, thereby forming a stable connection between the upper shell 41 and the lower shell 42, thereby wrapping the light bead 50 inside the capsule light dispersing member 40.

That is to say, the capsule light dispersing member 40 adopts a split design of upper shell 41 and lower shell 42, and is combined together through folding and snap connections, rendering the assembly process simpler and faster.

During a production process, a worker can quickly place the light beads 50 on the lower shell 42 and then fasten the upper shell 41, thereby greatly improving the production efficiency. When the light strip malfunctions and requires repair or replacement of the light bead 50, simply separate the upper shell 41 and lower shell 42 through a snap connection to easily remove the light bead 50 for repair or replacement without damaging the entire light strip structure, reducing maintenance costs and difficulty. Furthermore, the perforation formed by the combination of the two ends of the upper shell 41 and the lower shell 42 has a good limiting effect on the wire 30. During the use of the light strip, the wire 30 will not shift or shake due to factors such as bending or vibration of the light strip, ensuring a stable and reliable electrical connection between the light bead 50 and the wire 30, thereby avoiding problems such as poor contact and short circuits caused by displacement of the wire 30, and improving the reliability and service life of the light strip. In addition, the capsule light dispersing member 40 composed of the upper shell 41 and the lower shell 42 can evenly wrap around the light beads 50, allowing the light emitted by the light beads 50 to be fully scattered inside the capsule. Due to the excellent scattering performance of the material of capsule light dispersing member 40, light can be emitted in a softer and more uniform manner after scattering, and the light can be reflected from the upper shell 41 to the lower shell 42, filling the entire cavity with light sources and achieving 360 degree light emission, improving the luminous quality and visual effect of the light strip. At the same time, the design of folding connection and buckle connection ensures the overall sealing and stability of the capsule light dispersing member 40, and will not affect the astigmatism effect due to loose connection parts.

As shown in FIG. 2, in an implementation mode, the light transmitting member 10 is provided with a filter layer 12 in a peripheral area of the accommodating cavity 11.

In an implementation mode, the light transmitting member 10 is made of plastic material and can be co-extruded during the injection molding process. Inject the material of the filter layer 12 and the main material of the light transmitting member 10 into the mold simultaneously, so that the filter layer 12 and a main body of the light transmitting member 10 are integrally formed. This method can ensure the bonding strength between the filter layer 12 and the light transmitting member 10, and thickness and uniformity of the filter layer 12 are easier to control. The light emitted by the light bead 50 diverges through the capsule light dispersing member 40 and spreads out in all directions. Some of the light will spread onto the reflective sheet 60, which can reflect the spread light again. These reflected light rays, together with other light rays directly directed towards the light transmitting member 10, are directed towards the filter layer 12. The filter layer 12 can selectively absorb specific wavelengths of light that are relatively dazzling, such as blue light, purple light, etc. These glaring rays often have high energy and short wavelengths, and prolonged direct gaze can cause harm to the human eye, leading to discomfort symptoms such as eye fatigue, dryness, and pain. Through the absorption effect of the filter layer 12, the intensity of dazzling light entering the human eye is greatly reduced, rendering the light emitted by the product softer and more comfortable. For example, in lighting products, after providing the filter layer 12, the originally dazzling cold white light can be transformed into warm and soft warm white light, thereby effectively reducing the stimulation to the human eye and improving visual comfort.

As shown in FIG. 2, in an implementation mode, the light transmitting member 10 is provided above the filter layer 12 and is further provided with a scattering layer 13.

In an implementation mode, the scattering layer 13 can be made of plastic particles with diffusing properties, such as diffusing PC (polycarbonate) or diffusing PMMA (polymethyl methacrylate). These plastic particles are put into the injection molding machine and the injection molding process is used to form the scattering layer 13 above the filter layer 12. The soft light formed by filtering through the filter layer 12 enters the scattering layer 13, and small structures or special materials on a surface of the scattering layer 13 reflect and spread the light. The light continuously reflects and scatters within the scattering layer 13, rendering the originally directional or locally concentrated light more evenly distributed throughout the entire illumination area. For example, in some large lighting scenarios such as shopping malls, exhibition halls, etc., the scattering layer 13 can ensure more uniform light intensity and color distribution at various positions, avoiding uneven brightness or color deviation, and improving lighting quality. Besides that, reflection and diffusion of light by the scattering layer 13 make the light softer and more natural, reducing the direct and glaring effects of the light. When observing the illuminated area of the light strip, the human eye will not feel uncomfortable due to the strong focus of the light, further enhancing visual comfort.

As shown in FIGS. 1, 2, 3, and 7, in an implementation mode, the scattering layer 13 is provided with at least one reflective cavity 14.

In an implementation mode, according to the design requirements of the light strip, design and manufacture an injection mold with a structure of the reflective cavity 14. The shape, size, and distribution position of the reflective cavity 14 inside the mold need to be accurately designed. The reflective cavity 14 can be in different shapes such as circular, square, hexagonal, etc., and the number of the reflective cavity 14 is determined according to actual needs. Usually, multiple reflective cavity 14 will be provided on one scattering layer 13. Plastic particles with scattering properties (such as scattering PC, scattering PMMA, etc.) are placed into a barrel of the injection molding machine and them are heated until the plastic particles are in a molten state. Molten plastic is injected into a mold with the structure of the reflective cavity 14 through the screw of an injection molding machine. Under high pressure and suitable temperature, the plastic fills the mold cavity, thereby forming the scattering layer 13 with the reflective cavity 14.

That is to say, the presence of the reflective cavity 14 changes the propagation path of light within the scattering layer 13. When the light enters the scattering layer 13, a portion of the light will directly reflect and scatter on the surface of the scattering layer 13, and another portion of the light will enter the reflective cavity 14. Inside the reflective cavity 14, light will reflect multiple times on the cavity wall, allowing the light to spread more fully. Compared with the scattering layer 13 without the reflective cavity 14, the scattering layer 13 with the reflective cavity 14 can propagate light in a wider direction, greatly improving the reflection and diffusion efficiency of light, thereby further optimizing the illumination uniformity of the light strip. In addition, due to the multiple reflections and diffusion of light by the reflective cavity 14, some of the light that may have been lost due to surface reflection of the scattering layer 13 can be reused, increasing the total amount of light emitted from the scattering layer 13 and thus improving the illumination brightness of the light strip. At the same time, the propagation of light in a wider direction also expands the illumination range of the light strip, allowing the light strip to illuminate a larger area with the same power and quantity of the light beads 50, thereby improving the effectiveness and practicality of lighting.

Referring to FIGS. 1, 2, 3, and 7, in an implementation mode, a cross-section of the reflective cavity 14 is elliptical or curved.

In an implementation mode, there are two reflective cavities 14, which are distributed vertically in the scattering layer 13. A cross-section of an upper of the reflective cavity 14 is curved, a cross-section of a lower of the reflective cavity 14 is elliptical. That is to say, the light first passes through the lower of the elliptical reflective cavity 14, which preliminarily converges and reflects the light in a regular manner, rendering the light more concentrated and directed towards the curved reflective cavity 14 at the upper end. The upper curved reflective cavity 14 reflects and spreads light for a second time, and scatters in multiple directions. This dual reflection and diffusion method greatly increases the propagation path and scattering angle of light, allowing the light to cover the illumination area more widely. Besides that, a regular reflection effect of the elliptical reflective cavity 14 at the lower end can reduce the local concentration of light, and the scattering effect of the curved reflective cavity 14 at the upper end further balances the intensity distribution of light. By combining the two, the dark areas and light spots within the illumination area are effectively eliminated, resulting in a more uniform distribution of light throughout the entire area.

Figure 6:
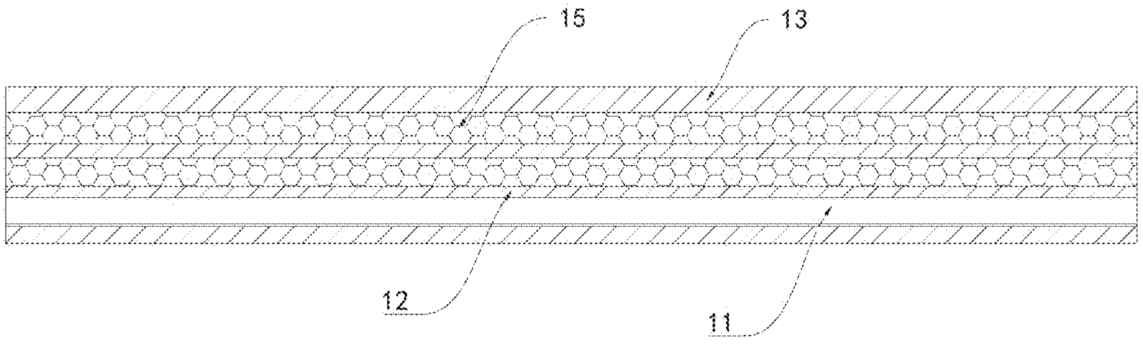
FIG. 6 is a schematic sectional view of a light transmitting member provided by the present disclosure.
Figure 7:
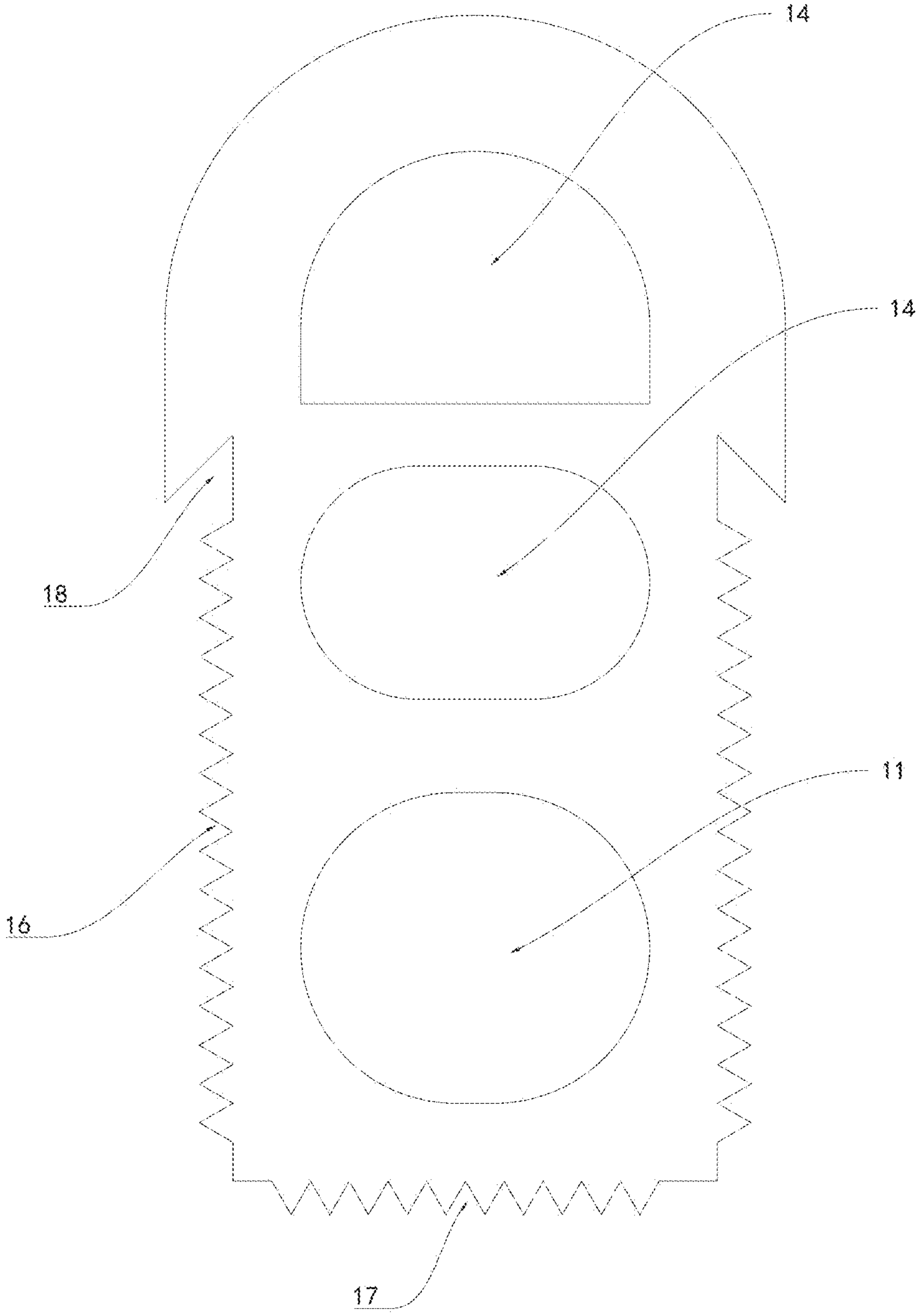
FIG. 7 is a front view schematic diagram of the light transmitting member provided by the present disclosure.

As shown in FIG. 6, in an implementation mode, a cavity wall of the reflective cavity 14 is provided with a textured layer 15.

In an implementation mode, based on design requirements of the light strip and the desired optical effect, design the style of the concave convex textured layer 15 on the wall of the reflective cavity 14. Texture can be regular geometric shapes, such as pyramids, hemispheres, squares, etc., or irregular natural textures, such as simulating rough textures on rock surfaces.

That is to say, the concave convex textured layer 15 increases the reflection area and angle of the light on the wall of the reflective cavity 14. When light enters the reflective cavity 14, multiple reflections and scattering occur on various surfaces of the textured surface. Compared with the reflective cavity 14 with smooth cavity walls, the propagation path of the light in the textured layer 15 is more complex and can be more widely spread to various directions. This makes the light emitted from the scattering layer 13 more uniform, reduces the brightness difference in the illumination area, and improves the illumination quality of the light strip. Furthermore, due to the continuous reflection and diffusion of the light by the concave convex textured layer 15, the light can be more evenly distributed within the illumination area. Whether directly above or on the side of the light strip, a relatively consistent light intensity can be obtained, thereby avoiding the occurrence of local excessive brightness or darkness.

As shown in FIGS. 1, 2, 3, and 7, in an implementation mode, the light transmitting member 10 is provided with a first saw tooth 16 on two sides, and the light blocking member 20 is provided with a second saw tooth 21 corresponding to the first saw tooth 16.

In an implementation mode, the first saw tooth 16 and the second saw tooth 21 are cooperated with each other to form a labyrinth like sealing structure through hot pressing fusion. This structure increases the length and curvature of the path for light and external impurities to pass through the connection between the light transmitting member 10 and the light blocking member 20, thereby greatly improving the sealing effect. It can effectively prevent light leakage from the connection and ensure that the light emitted by the light strip can accurately illuminate the designated area according to the design requirements. At the same time, it also avoids external impurities such as dust and water vapor from entering the interior of the light strip, protecting the components such as the light beads 50 and the wire 30 inside the light strip, and extending the service life of the light strip. In addition, the engagement of the serrated structure increases the contact area and friction between the light transmitting member 10 and the light blocking member 20, rendering the connection between the two more secure. During the use of the light strip, even under certain external forces such as vibration, compression, etc., the light transmitting member 10 and the light blocking member 20 are not easily displaced or separated, thereby ensuring the stability of the overall structure of the light strip and reducing the possibility of optical performance degradation or failure caused by structural looseness.

As shown in FIGS. 1, 2, 3, and 7, in an implementation mode, a bottom of the light transmitting member 10 is further provided with a third saw tooth 17, and the light blocking member 20 is provided with a fourth saw tooth 22 corresponding to the third saw tooth 17.

In an implementation mode, a cooperation between the third saw tooth 17 and the fourth saw tooth 22 forms a multi-directional connection structure with the first saw tooth 16 and the second saw tooth 21 on two sides. When subjected to forces from different directions, such as vertical tensile force, horizontal shear force, etc., each connection part can share the force together, effectively improving a connection strength between the light transmitting member 10 and the light blocking member 20. Compared to relying solely on the serrated connection on two sides, this multi-directional connection structure can withstand greater external forces and reduce the risk of damage to the connection area due to excessive force.

As shown in FIGS. 1, 2, 3, and 7, in an implementation mode, a top of the light blocking member 20 is provided with a protruding end 23, and the light transmitting member 10 is provided with a clamp slot 18 corresponding to the protruding end 23.

In an implementation mode, the sealing structure formed by the clamp slot 18 and the protruding end 23 between the light transmitting member 10 and the light blocking member 20 can effectively block foreign objects such as dust, water vapor, and insects from entering an interior of the light strip. Lamp strips used outdoors or in harsh environments, this sealing structure can prevent dust from accumulating on the surface of optical components, affecting the transmittance and luminous effect of light; at the same time, it prevents water vapor from entering and causing short circuits or corrosion of components, extending the service life of the light strip. Furthermore, a cooperation between the protruding end 23 and the clamp slot 18 makes outer surfaces of the light transmitting member 10 and the light blocking member 20 flush, rendering the appearance of the light strip more concise and smooth, with better integrity, avoiding visual abruptness caused by protruding or recessed connection parts, improving the beauty and quality of the light strip, and better integrating into various indoor and outdoor decoration environments.

The above embodiments are preferred implementation modes of the present disclosure. In addition, the present disclosure can also be implemented in other ways, and any obvious replacement is within the protection scope of the present disclosure without departing from the concept of the technical solution.

What is claimed is:

1. A light strip structure, comprising: a light transmitting member, a light blocking member, a wire, and at least one capsule light dispersing member;

wherein the light transmitting member is provided with an accommodating cavity along a length direction, the wire is provided in the accommodating cavity, and the wire is provided with a plurality of light beads that are uniformly distributed;

the capsule light dispersing member is wrapped around the light beads;

the light blocking member is connected to the light transmitting member;

light emitted by the light beads diverges through the capsule light dispersing member and is emitted along the light transmitting member;

wherein the light transmitting member is provided with a filter layer in a peripheral area of the accommodating cavity;

wherein the light transmitting member is provided above the filter layer and further provided with a scattering layer;

there are an upper reflective cavity and a lower reflective cavity that are distributed vertically in the scattering layer;

a cross-section of the upper reflective cavity is curved, a cross-section of the lower reflective cavity is elliptical;

when the light first passes through the lower reflective cavity, the lower reflective cavity converges and reflects the light, rendering the light concentrated and directed towards the upper reflective cavity, and the upper reflective cavity reflects and spreads the light for a second time, and the light is scattered in multiple directions.

2. The light strip structure according to claim 1, wherein a reflective sheet is provided at a bottom of the accommodating cavity, and the wire is provided on an upper surface of the reflective sheet.

3. The light strip structure according to claim 1, wherein the capsule light dispersing member is composed of an upper shell and a lower shell, and the upper shell and the lower shell form a folded connection.

4. The light strip structure according to claim 1, wherein a cavity wall of the upper reflective cavity or the lower reflective cavity is provided with a textured layer.

5. The light strip structure according to claim 1, wherein two sides of the light transmitting member are provided with a first saw tooth, and the light blocking member is provided with a second saw tooth corresponding to the first saw tooth.

6. The light strip structure according to claim 5, wherein a bottom of the light transmitting member is further provided with a third saw tooth, and the light blocking member is provided with a fourth saw tooth corresponding to the third saw tooth.

7. The light strip structure according to claim 1, wherein a top of the light blocking member is provided with a protruding end, and the light transmitting member is provided with a clamp groove corresponding to the protruding end.

* * * * *